United States Patent [19]

Leroux

[11] 4,279,101
[45] Jul. 21, 1981

[54] MODULAR HYDROPONIC SYSTEM
[76] Inventor: Frank W. Leroux, 5575 Williamsdale Ct., Seminole, Fla. 33541
[21] Appl. No.: 71,271
[22] Filed: Aug. 30, 1979
[51] Int. Cl.³ .............................................. A01G 31/00
[52] U.S. Cl. ........................................................ 47/64
[58] Field of Search .................... 47/18, 39, 59–64, 47/65, 79, 73

[56] References Cited
U.S. PATENT DOCUMENTS

| 599,263 | 2/1898 | Sherman | 47/73 |
|---|---|---|---|
| 2,152,254 | 3/1939 | Hansen | 47/62 |
| 2,205,303 | 6/1940 | Munsell | 47/63 |
| 2,810,988 | 10/1957 | Chin | 47/61 X |
| 3,024,569 | 3/1962 | Nearing et al. | 47/18 |
| 3,660,933 | 5/1972 | Wong | 47/62 |
| 4,054,911 | 9/1977 | Ware | 47/39 |
| 4,075,785 | 2/1978 | Jones | 47/62 |
| 4,106,235 | 8/1978 | Smith | 47/73 X |

FOREIGN PATENT DOCUMENTS

| 1003489 | 2/1957 | Fed. Rep. of Germany | 47/63 |
|---|---|---|---|
| 2619305 | 11/1976 | Fed. Rep. of Germany | 47/64 |
| 2748010 | 4/1978 | Fed. Rep. of Germany | 47/59 |
| 4528527 | 9/1970 | Japan | 47/59 |
| 424537 | 9/1974 | U.S.S.R. | 47/63 |

Primary Examiner—James R. Feyrer
Attorney, Agent, or Firm—Arthur W. Fisher, III

[57] ABSTRACT

A continuous flow, modular hydroponic system comprising a nutrient tray housing a nutrient feed supply operatively supported on a support structure and a plurality of plant cartridges removably mounted on a plant cartridge support member wherein each plant cartridge comprises a hollowing member housing a planting medium therein and having a coupling member formed on the upper portion thereof to mount the plant cartridge on the plant cartridge support member.

5 Claims, 7 Drawing Figures

MODULAR HYDROPONIC SYSTEM

BACKGROUND OF THE INVENTION

1. Field of the Invention

A continuous flow modular hydroponic system for the growth of plants.

2. Description of the Prior Art

The prior art discloses a number of hydroponic devices. For example, U.S. Pat. No. 3,667,158 shows a combined humidifier and plant apparatus including a first compartment, water trough being provided in the first compartment and a tray arranged to cover the water trough and for supporting a layer of soil above the trough. A second compartment is provided to receive a quantity of water. An immersion heater is located in the second compartment. A fan is positioned so as to drive air and water vapor across the surface of the water in the second compartment humidify the ambient atmosphere.

U.S. Pat. No. 3,451,162 illustrates a hydroponic apparatus including a housing means for forming a nutrient solution storage chamber. Pump means provided in the housing to pump the nutrient solution from the storage chamber to a supporting means holding the roots of the plants positioned within the housing means. Radiation means may also be provided in the housing means.

Additional examples of the prior art are found in U.S. Pat. Nos. 2,306,027; 3,095,670; 3,323,253; 3,543,437; 3,992,809; 3,841,023; 2,296,860; 2,963,819; 841,306; 1,245,441; 800,746; 2,777,253; 2,121,461; and French Pat. Nos. 857,501; 1,170,246; 1,400,547; and British Pat. No. 4,469.

SUMMARY OF THE INVENTION

The present invention relates to a continuous flow modular hydroponic system. More specifically the hydroponic system or apparatus comprises a plurality of plant support units operatively mounted on a support structure. The hydroponic system further includes a plant enclosure and a plurality of light absorbing elements.

Each plant support unit comprises a substantially rectangular nutrient tray and a substantially rectangular plant cartridge support member configured to cooperatively form a nutrient compartment therebetween. A plurality of cartridge apertures are formed in the support member to operatively support a corresponding plant cartridges. A nutrient feed supply is operatively coupled to the plant support units extends diagonally downward toward the return end of the nutrient tray to facilitate dispersion of the nutrient.

The plant enclosure comprises a frame to operatively support a plurality of partitions to protect the plants disposed therein.

The light absorbing elements as disclosed in U.S. Pat. No. 4,198,783, each comprise a frosted, convex bubble shaped member provided to optimize light absorption. It should be noted that the task is to optimize light absorption.

Each plant cartridge comprises a substantially cylindrical hollow member having a substantially annular coupling member or ring affixed to the upper portion thereof. A planting medium to support the seedling and plant is operatively housed within the substantially cylindrical hollow member by a retainer means. The support structure comprises a pair of substantially parallel vertical side walls and a pair of substantially parallel vertical end walls extending about the periphery of the plant enclosure. Extending inwardly from the side walls is a plurality of support legs each comprising a substantially horizontal support member and substantially vertical support member to operatively support the plant support units.

In use, the plant cartridges are placed into cartridge apertures. In operation nutrient is fed into the first plant support unit through a feed supply pipe or conduit to roots of the plants. Due to the slant of the bottom wall the nutrient is fed to next adjacent plant support unit and thence to the next adjacent plant support unit until it reaches the last plant support unit and returned.

In normal operation transfer of seedlings to the growing medium causes shock of ten (10) days to two (2) weeks. However, the unique plant cartridges of the instant invention obviates the necessity of transfer or transplanting. Moreover, mediums such as gravel act as a filter which build up a residue of minerals of detrimental to the controlled growth of the plants.

In contrast, the instant invention permits a continuous supply of closely controlled nutrient. Actual use of reduced the growth cycle by one-half with an increased yield.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

As shown in FIGS. 1 through 4, the present invention comprises a continuous flow modular hydroponic system generally indicated as 10 including a plurality of plant support units each generally indicated as 12 operatively mounted on a support structure generally indicated as 14. The hydroponic system 10 further includes a plant enclosure generally indicated as 16 and a plurality of light absorbing elements each generally indicated as 18.

Figure 5:
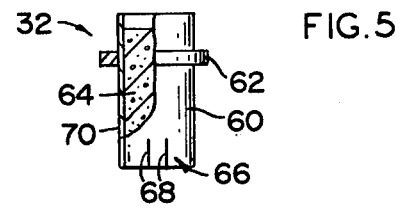
FIG. 5 is a detailed side view of a plant cartridge.
Figure 3:
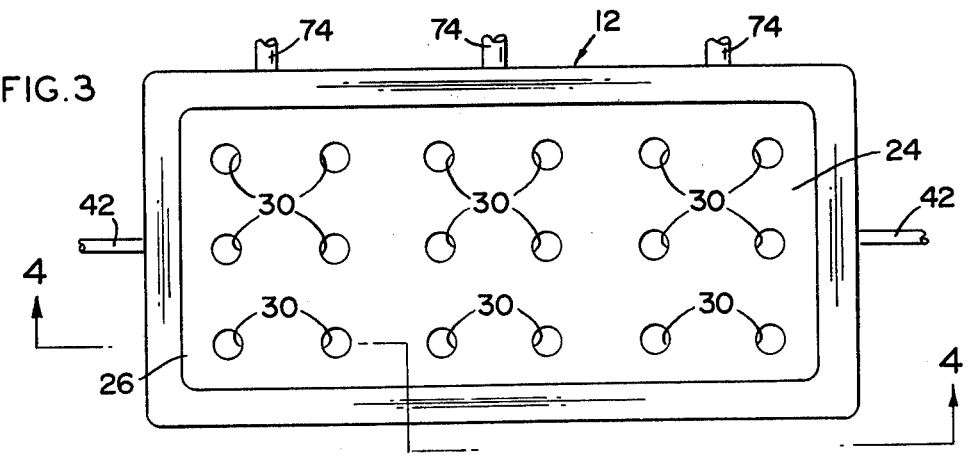
FIG. 3 is a top view of a plant support unit.
Figure 4:
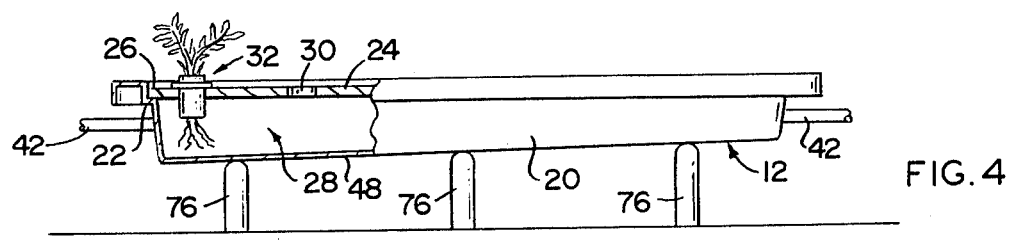
FIG. 4 is a cross-sectional side view of the plant support unit taken along line 4—4 of FIG. 3.

As best shown in FIGS. 3 and 4, each plant support unit 12 comprises a substantially rectangular nutrient tray 20 having a substantially horizontal ledge 22 formed about the upper periphery thereof and a substantially rectangular plant cartridge support member 24 having a corresponding ledge 26 formed about the periphery thereof configured to engage the ledge 22 to cooperatively form a nutrient compartment 28 therebetween. A plurality of cartridge apertures 30 to operatively support a corresponding plant cartridge each generally indicated as 32 (FIG. 5). A nutrient feed supply 34 is operatively coupled to the plant support units 12. More particularly, the nutrient feed supply comprises a pump 36 and storage tank 38 to feed nutrient therefrom to a substantially horizontal supply feed pipe 40 to the first plant support unit 12. Adjacent plant support units 12 are coupled together by interconnecting feed pipes 42 while the last plant support unit 12b is coupled to nutrient feed supply by return feed pipe 44. As more fully described hereinafter, the pump 36 may be actuated manually or automatically through timer 46 coupled to an electrical source (not shown). It should be noted that the bottom wall 48 extends diagonally downward toward the return end of the nutrient tray 20 to facilitate dispersion of the nutrient from feed pipes 40 and 42 as well as return nutrient to pump 36 and storage tank 38 as more fully described hereinafter.

Figure 1:
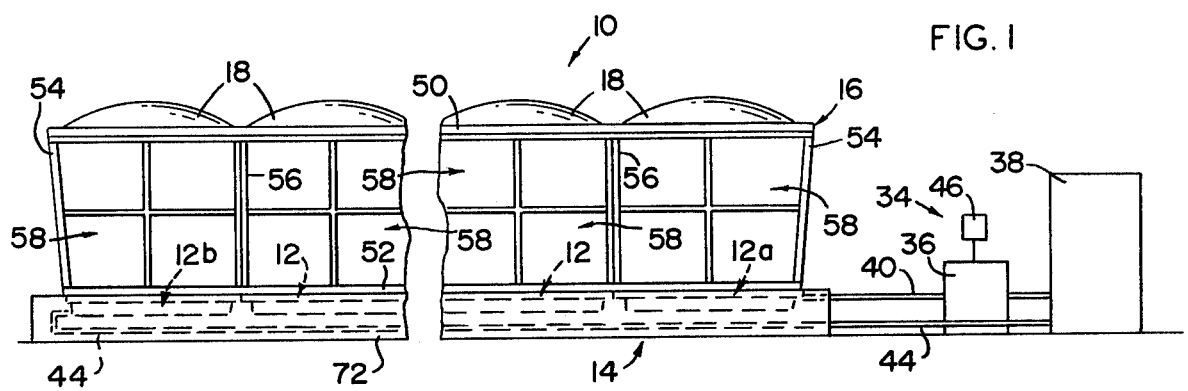
FIG. 1 is a side view of a hydroponic system.
Figure 2:
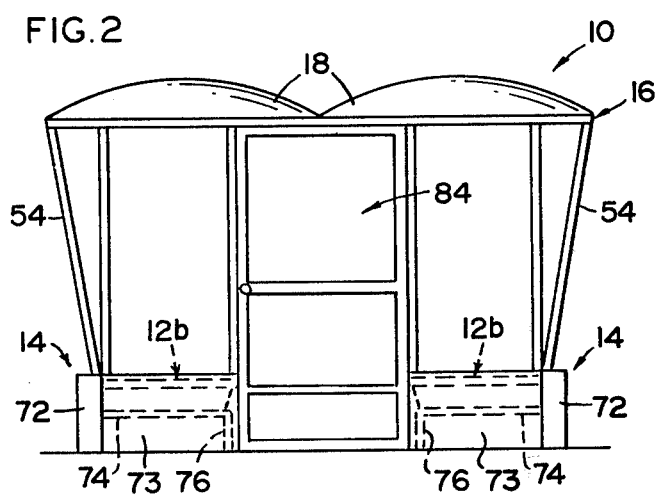
FIG. 2 is an end view of the hydroponic system.

As best shown in FIGS. 1 and 2, the plant enclosure 16 comprises a frame to operatively support a plurality of partitions to protect the plants disposed therein. More specifically, the frame comprises upper and lower channels 50 and 52 respectively extending across the sides and ends of the plant enclosure 16. The end partitions 54 are fixedly attached between upper and lower channels 50 and 52 respectively while the side partitions as described more fully hereinafter are slidably disposed within upper and lower channels 50 and 52 respectively to permit access into the entire interior of the plant enclosure 16. Upper and lower channels 50 and 52 are held in fixed spaced relation by upright members 56. The partitions 58 may comprise screen panels or non-porous, frosted panel members. As shown in FIG. 2, the hydroponic system 10 may comprise a pair of substantially parallel series of interconnected plant support units 12.

The light absorbing elements 18 as disclosed in U.S. Pat. No. 4,198,783, each comprise a frosted, convex bubble shaped member to optimize light absorption. It should be noted that the task is to optimize light absorption. The convex element is at least six feet in width and twelve inches in radial curvature.

Figure 6:
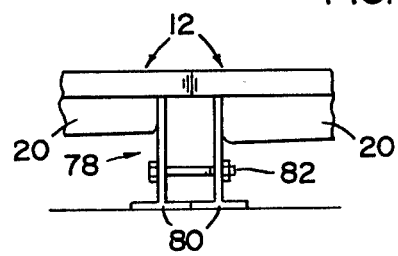
FIG. 6 is a detailed end view of a support structure.

As best shown in FIG. 5, each plant cartridge 32 comprises a substantially cylindrical hollow member 60 having a substantially annular coupling member or ring 62 affixed to the upper portion thereof. A planting medium 64 to support the seedling and plant is operatively housed within the substantially cylindrical hollow member 60 by a retainer means generally indicated as 66. The retainer means 66 comprises a pair of retainer members 68 which extend inwardly relative to the side wall 70 of the substantially cylindrical hollow member 60 such that the lower portion of the planting medium 64 engages the inner surface thereof. As best shown in FIGS. 1 and 2, the support structure 14 comprises a pair of substantially parallel vertical side walls 72 and a pair of substantially parallel vertical end walls 73 extending about the periphery of the plant enclosure 16. Extending inwardly from the side walls 72 is a plurality of support legs each comprising a substantially horizontal support member 74 and substantially vertical support member 76 to operatively support the plant support units 12. FIG. 6 shows an alternate embodiment of the support structure 78 comprising a pair of substantially T-shaped members 80 coupled together by a substantially horizontal interconnecting support member 82 to operatively support the plant support units 12 therebetween. As best shown in FIG. 2, a door 84 is provided at one end of the enclosure 16 to permit access to the hydroponic device 10 between the substantially parallel series of interconnected plant support units 12.

In use, the plant cartridges 32 are placed into cartridge apertures 30. In operation nutrient is fed from the nutrient storage tank 38 by pump 36 actuated either manually or through the timer 46, coupled to an external electrical source (not shown). The nutrient is fed into the first plant support unit 12a through feed supply pipe or conduit 40 to roots 86 of the plants 88. Due to the slant of the bottom wall the nutrient is fed to next adjacent plant support unit 12 and thence to the next adjacent plant support unit 12 until it reaches the last plant support unit 12b and returned directly to the nutrient storage tank 38.

In normal operation transfer of seedlings to the growing medium causes shock of ten (10) days to two (2) weeks. However, the unique plant cartridges 32 of the instant invention obviates the necessity of transfer or transplanting. Moreover, mediums such as gravel act as a filter which build up a residue of minerals of detrimental to the controlled growth of the plants.

In contrast the instant invention permits a continuous supply of closely controlled nutrient. Actual use as reduced the growth cycle by one-half with an increased yield.

As previously discussed the side partitions are slidably disposed within channels 50 and 52 to permit access into the interior of plant enclosure 16. The cross-sectional dimension of the lower side channels 52 or separation therebetween permits exposure of all the plants within the plant enclosure 16 for maintenance and picking while the cross-sectional dimension of the upper channels 50 permits optimum light absorption through the dimension of the frosted convex members or elements 18.

Figure 7:
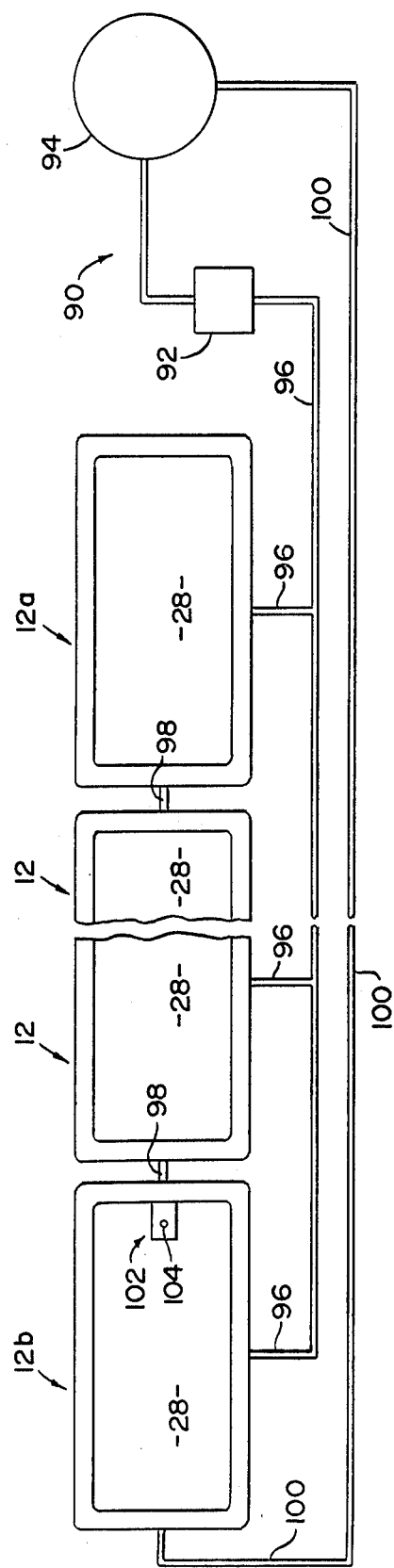
FIG. 7 is a side view of an alternate embodiment of the plant support unit.

FIG. 7 shows an alternate feed supply 90 including a pump 92 and storage tank 94 to feed nutrient through feed supply conduit 96 to each of the plant support units 12. Adjacent plant support units 12 are coupled together by interconnecting feed conduit 98 while the last plant support unit 12b is coupled to the nutrient feed supply by return feed conduit 100. The last plant support unit 12b includes a liquid level control comprising member 102 having an aperture 104 formed on the upper portion thereof. As a result the liquid nutrient feeds through the plant support units 12 and seeks an even or equal depth therebetween.

In essence the technique of growing with the present hydroponic system comprises a process of rooting and growing a plant to maturity in a single medium 64 supported in the plant cartridge 32. The single medium 64 is seeded and together the plant cartridge 32 placed in the plant cartridge support member or tray 24. The tray 24 is then placed on the nutrient tray 20 to immerse the medium 64 in the nutrient. To facilitate commercial use an incubator tray 24 may be initially employed. After the plant has started to mature the plant cartridge 32 are moved or transplanted to a growing tray 24 where the apertures 30 are spaced further apart to permit full growth and maturity of the plants. Once the plant has reached maturity and been harvested such as a tomato plant, the plant may be severed from the top of the plant cartridge 32. The tray 24 may then be tipped exposing the roots which in turn may be severed.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A hydroponic system comprising a plurality of plant support units in fluid communication and disposed end to end to form a continuous flow modular hydroponic system, each plant support unit including a nutrient tray of liquid nutrient impervious material to operatively house a nutrient therein, a support means comprising a support structure defining at least one support surface to operatively support each said plant support unit and a nutrient feed supply comprising a pump and storage tank to feed nutrient therefrom to a supply pipe operatively coupled to the first of said plant support units, the adjacent plant support units being coupled together by interconnecting feed pipes, the last of said plant support unit being coupled to said nutrient feed supply by a return feed pipe, each said plant support unit comprising a nutrient tray having a ledge formed about the upper inner peripheral portion thereof and a plant cartridge support member having a corresponding ledge formed about the periphery thereof configured to matingly engage said ledge of said nutrient tray to form a nutrient compartment within said tray, said plant cartridge support member including at least one cartridge aperture formed thereon to operatively support a corresponding plant cartridge, at least one cartridge operatively configured to support a plant therein, said plant medium cartridge comprising a cylindrical hollow member having a coupling member formed about the upper portion thereof to operatively couple said plant cartridge to said plant cartridge support member and a retainer means formed on the lower portion thereof to operatively retain a planting medium within said hollow member, said retainer means comprising at least one retainer member extending inwardly relative to the side wall and from above the bottom portion of said substantially cylindrical hollow member to operatively engage the lower portion of the planting medium.

2. The hydroponic apparatus of claim 1 wherein said support structure comprises a pair of substantially parallel vertical side walls, a plurality of support legs each comprising a substantially vertical member placed between said side walls and a substantially horizontal support member extending inwardly from said side walls defining said horizontal surface to operatively support said nutrient tray.

3. The hydroponic apparatus of claim 1 wherein said plant cartridge comprises a substantially cylindrical hollow member having a substantially annular coupling ring affixed to the upper portion thereof.

4. The hydroponic apparatus of claim 1 wherein said retainer means comprises a pair of said retainer members.

5. The hydroponic apparatus of claim 1 wherein said support structure comprises at least a pair of substantially T-shaped members coupled together by substantially horizontal interconnecting support member to operatively support said plant support unit therebetween.

* * * * *